(12) United States Patent
Norris

(10) Patent No.: US 9,988,191 B2
(45) Date of Patent: Jun. 5, 2018

(54) LOCKABLE ENCLOSURE SYSTEM

(71) Applicant: Wireless Resident Nurse Alert Technology, Inc., Nepean (CA)

(72) Inventor: Joseph Norris, Nepean (CA)

(*) Notice: Subject to any disclaimer, the term of this patent is extended or adjusted under 35 U.S.C. 154(b) by 1000 days.

(21) Appl. No.: 14/328,110

(22) Filed: Jul. 10, 2014

(65) Prior Publication Data
US 2015/0014319 A1   Jan. 15, 2015

Related U.S. Application Data

(60) Provisional application No. 61/844,563, filed on Jul. 10, 2013.

(51) Int. Cl.
| | | |
|---|---|---|
| *B65D 45/16* | (2006.01) | |
| *B65D 41/02* | (2006.01) | |
| *G06F 1/16* | (2006.01) | |
| *H04M 1/18* | (2006.01) | |

(52) U.S. Cl.
CPC .......... *B65D 41/02* (2013.01); *G06F 1/1626* (2013.01); *H04M 1/18* (2013.01); *G06F 2200/1633* (2013.01)

(58) Field of Classification Search
CPC .................. B65D 41/02; G06F 1/1626; G06F 2200/1633; H04M 1/18
USPC ........................................................ 220/324
See application file for complete search history.

(56) References Cited

U.S. PATENT DOCUMENTS

| | | |
|---|---|---|
| 4,836,256 A | 6/1989 | Meliconi |
| 4,901,852 A | 2/1990 | King |
| 5,507,406 A | 4/1996 | Urciuoli et al. |
| 6,031,524 A | 2/2000 | Kunert |
| 6,068,119 A | 4/2000 | Derr et al. |
| D455,730 S | 4/2002 | Hakim-Nelson |
| 6,646,864 B2 | 11/2003 | Richardson |
| 6,659,274 B2 | 12/2003 | Enners |
| 8,706,177 B2* | 4/2014 | Norris .............. G08B 5/223 455/575.1 |
| 2012/0061412 A1 | 3/2012 | Vovan |

FOREIGN PATENT DOCUMENTS

WO   WO 2003/101245   12/2003

* cited by examiner

*Primary Examiner* — Anthony Stashick
*Assistant Examiner* — James M Van Buskirk
(74) *Attorney, Agent, or Firm* — B. Aaron Schulman, Esq.; Stites & Harbison, PLLC

(57) ABSTRACT

A lockable sealable enclosure system with a lockable lid openable, and re-lockable, through use of a locking tool. The enclosure system comprises a bottom container, which can optionally support a transparent film to provide water-resistance to the container, secured by a cover. The cover is provided with securing members which lockingly engage the bottom container. A lock release tool comprises latching members for engagement with the securing members, and a cam and cam followers which operate on the latching members are operably able to pull the securing members outwards to release the locked engagement. The enclosure system can include a shock and water resistant wireless pager enclosure.

17 Claims, 14 Drawing Sheets

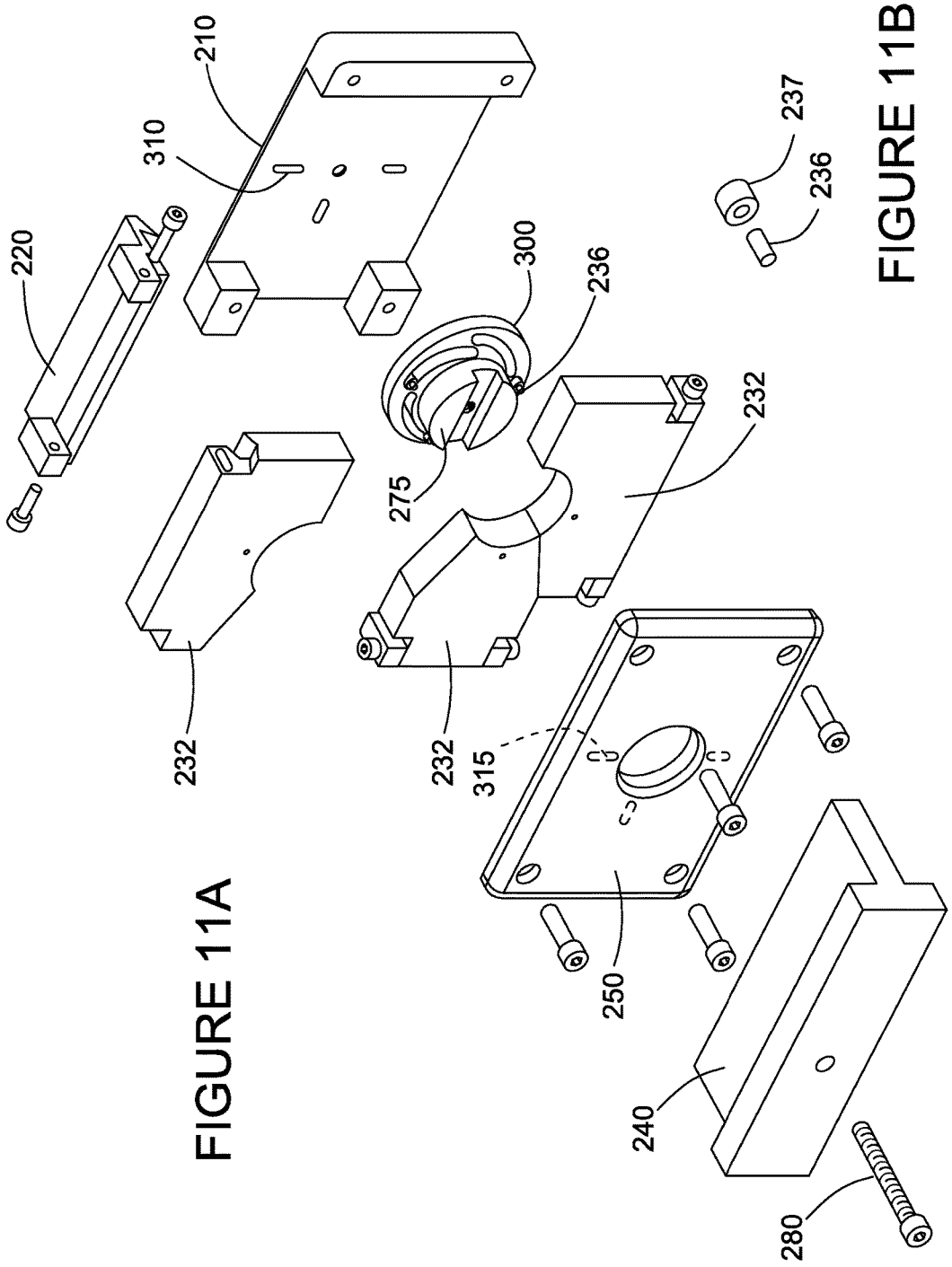

LOCKABLE ENCLOSURE SYSTEM

CROSS REFERENCE TO RELATED APPLICATIONS

This application claims benefit of U.S. Provisional Application No. 61/844,563, filed Jul. 10, 2013 and U.S. application Ser. No. 13/938,554, filed Jul. 10, 2013, now U.S. Pat. No. 8,706,177, issued Apr. 22, 2014, both of said applications hereby incorporated by reference).

TECHNICAL FIELD

The present disclosure relates to a lockable sealable enclosure system. More particularly, the present disclosure relates to a lockable sealable enclosure system with a lockable lid openable, and re-lockable, through use of a locking tool.

BACKGROUND

It is well known that enclosures can be used to store many types of items, such as foodstuffs, medicine, or even electronic appliances. However, such enclosures can be subject to tampering when the lid is removed and the contents accessed.

As an example, this can occur in a workplace setting, where numerous co-workers share a communal fridge, where food in such a fridge can be easily accessed by any co-worker on site and removed or taken from such enclosures (i.e. food containers).

As another example, pocket pagers are placed in enclosures that are waterproof and/or shock-resistant. However, due to security requirements, it is desirable to make such enclosures tamper-proof U.S. Pat. No. 5,507,406 discloses a container comprising a receptacle and a lid combination which are formed of thermoformed plastic such as PVC (polyvinyl chloride), PS (polystyrene), or PET (polyethylene). The receptacle and the lid have sections thereof which nest intimately together to form a seal. The receptacle includes a frangible portion which breaks when the lid is removed.

A further example is U.S. Patent Application Publication No. US2012/0061412 which discloses a tamper-evident container which provides a visual indication to the container's owner if the container has been opened, and then re-closed.

However, such a containers as those described above do not prevent access to the container, and the items therein; they merely indicate to the owner of the container that the container itself has been tampered with or accessed. In essence, the container, and the items therein, do not prevent access from third parties to the containers contents, as these containers are not tamper-proof.

A number of attempts have been made to provide enclosures for pocket pagers that are water- and/or shock-resistant.

U.S. Pat. No. 6,031,524 issued Feb. 29, 2002 to Kunert discloses a complicated user-replaceable component assembly, which permits replacement of components and devices such as portable electronic devices. An environmental seal is provided around the components to protect the inner circuitry of the electronic device. Shock-resistant mounting of the display panel beneath the keypad and accommodation for the electric connection between the keypad and the portable electronic device's inner circuitry is provided. However, Kunert requires the provision of a keypad on the enclosure, which is electrically connected to and substitutes for the keypad of the portable electronic device.

U.S. Pat. No. 6,646,864 issued Nov. 11, 2003 to Richardson discloses a protective case for an electronic device that has a touch screen. The touch screen is protected with a membrane adapted to the specific contour and profile of the electronic device and allows the user to use a touch screen interface with no shortcomings. The protective case is further adapted to allow infra-red and other communication signals while the device is secured inside the case. Further, electrical connections can be made through the case without affecting the protection afforded the electronic device inside. The enclosure is in the form of a hinged clamshell device with external ribs that prevent torsional stresses thereon and internal foam inserts for shock-relief. Keypad and touch screen input may be through a sheet of thin plastic disposed within an opening in the enclosure and sealed in water-resistant fashion by the interposition of an O-ring between it and the enclosure opening. Thus, in assembling the enclosure, a number of components must be maintained in position simultaneously, which may be problematic, especially in a high-traffic environment such as at a facility.

U.S. Pat. No. 6,659,274 issued Dec. 9, 2003 to Enners discloses a container for a PDA comprising a three dimensional enclosure open at one end and through which the PDA can be inserted. A clear rubber screen is positioned over the touch screen of the PDA, to provide touch point access thereto. The opening in the enclosure can be capped by a cover having an O-ring across an internal projection, which matingly engages with the open end of the cover to provide a water-resistant seal. The rubber screen is integral with or permanently affixed to the enclosure, which provides significant difficulties in construction and precludes the replacement of the screen in the event of a tear or rupture. As well, the use of clear rubber would appear to significantly increase the cost of construction. Furthermore, the material may not be highly conducive to accurate data entry therethrough, or to visibility of the visual outputs of the pager.

U.S. Pat. No. 6,068,119 issued May 30, 2000 to Derr et al discloses a waterproof protective device for holding an apparatus having an interaction field formed from a dimensionally stable protective housing having lower and upper housing parts. The two parts are releasably hingedly connected together and an inside contour of the protective housing is adapted and constructed to closely receive the apparatus with approximately no play. The protective housing is provided with a transparent elastically flexible operating area of reduced wall thickness to enable an interaction field to be viewed and manipulated while encased within the enclosure. A seal is provided between the two parts in the form of a mating circumferential groove and rim, one or both of which may be provided with lips. Derr et al's apparatus renders it awkward to insert the pager into and remove the pager from the enclosure. A separate pusher must be used to urge the pager out of the enclosure.

U.S. Pat. No. 4,836,256 issued Jun. 6, 1989 to Meliconi discloses a shock-proof protective sheath for television remote controls, which comprises a hollow container and holder element, embodied in shock proof material that substantially matches and hugs the external profile of the appliance it encompasses. It is provided with at least two openings, one of which affords access to the remote control's push buttons and the other of which allows passage of the controlled pulses. The window on the front of the sheath, corresponding to the push buttons of the remote control is covered by a thin plastic material, welded or affixed by adhesive strip to the edges of the opening in the sheath, which allows buttons to be pressed while maintaining water tightness. Again, the permanent attachment of the window within the sheath increases the difficulty and cost of construction and precludes easy replacement of the screen in the event of a tear or a rupture.

U.S. Pat. No. 4,901,852 issued Feb. 20, 1990 to King discloses a protective cover for pagers comprising a film of transparent stretchable material (e.g. 595HC silicon plastic) formed to cover the top, four sides and at least a portion of the bottom of a pager. The cover includes accordion-type pleats, which are positioned to reside adjacent switches, a belt clip and the like, to allow operation thereof. While some modicum of water tightness may be provided, subject to the size and positioning of openings in the enclosure, King's enclosure provides no means of shock-resistance.

U.S. Design Pat. No. D455,730 issued Apr. 16, 2002 to Hakim-Nelson discloses a case of a certain dimension adapted to fit the pager, constructed of an entirely transparent material. Protrusions are provided to accommodate push buttons. Access to the enclosure is through a removable door. Again, there appears to be only minimal shock-resistance to Hakim-Nelson's enclosure.

PCT International Application No. PCT/FI03/00434 published Dec. 11, 2003 in the name of Bordi discloses a case where an electronic device includes a watertight and at least partly transparent case body substantially corresponding to the shape of the electronic device, the case being open at one end, as well as the lid watertightly closing the open end of the case body. It also includes an annular intermediate part on which both the case body and the lid are supported and to which they can be latched. The case body includes an annular supporting surface and the lid includes an annular pressure contact area, so that when closing the lid, the sealing flange is pressed in between the supporting surface and the pressure contact area thereby closing the space defined by the lid and the case body.

Finally, CA 2,517,541 issued Feb. 28, 2007 to Lefebvre et al. discloses a shock and water resistant wireless pager enclosure comprises a bottom having thickened walls, a top lip and interior foam strips. The top edges of the strips are coplanar with the top. A transparent film is supported thereon and on the lip and secured by a cover removably hinged to the bottom by a protrusion at one end, through which a hinge pin passes. The protrusion and pin are accepted in a trough in the bottom. The bottom is rounded about the trough to facilitate the hinged motion. The pin prevents the cover from sliding laterally from the bottom. The bottom secures the pager, the cover is fixed thereto by screws, pinching the film between them. A cover loop proximate the protrusion facilitates opening of the cover and provides a mechanism for attaching a clip. The cover may be multi-coloured for easy identification. The bottom contains a ribbon strip to facilitate pager removal and/or an RFID device to locate the enclosure and thus the pager and/or the user.

Accordingly, it is desirable to provide an enclosure for a pocket pager or similar device that is water-resistant, of simple construction, and overcomes the disadvantages of the prior art devices noted above, including complexity construction with numerous parts. It is further desirable to provide an enclosure for a pocket pager that is shock-resistant, and also tamper-proof during normal use.

It would therefore be advantageous to have a tamper-proof sealable enclosure system, which can be used for various purposes, with a lockable lid openable through use of a locking tool. It would be still further advantageous to have a tamper-proof sealable enclosure system with a lockable lid openable, and re-lockable, through use of a locking tool. In this regard, the present enclosure system substantially fulfills this need.

SUMMARY

It is an object to provide an improved, sealable enclosure system with a lockable lid, which can be used for various purposes. In the discussion below, references to "pager" should be understood as including any similar device for which the same general requirements of water-resistance, shock-proofing, visibility of display and protection against tampering are applicable.

It is a further object to provide an improved, sealable enclosure system with a lockable lid openable, and re-lockable, through use of a locking tool.

According to one aspect of the present invention, there is provided a lockable enclosure system comprising: i) a bottom portion with an open top and comprising a pair of opposed first and second side walls and a pair of opposed first and second end walls, each of said walls comprising a substantially planar upper edge region and a perimetric flange, the first and second side walls and the first end wall each further comprising engagement members extending normally from the perimetric flange; ii) a removable cover comprising: (1) a plurality of securing members each extending from outer edges of the cover, the securing members being adapted to lockably engage the first and second side walls and the first and second end walls; (2) recess regions between the securing members adapted to receive and engage the engagement members; and iii) a lock release tool comprising (a) a base plate configured to be receivable over the removable cover; (b) a plurality of latch members each adapted to engage a respective one of the securing members; (c) a cam assembly and a plurality of cam followers each cam follower being operatively connected to a respective one of the latch members; and (d) a rotatable handle operatively connected to the cam assembly to move the cam followers selectively between a minimum engaged position in which the latch members are secured to the removable cover, and a maximum engaged position in which pressure exerted by the cam followers moves the latch members to pull the securing members away from the first and second side walls and the first and second end walls to release the removable cover.

According to another aspect of the present invention, there is provided a lockable enclosure system comprising: i) a bottom portion with an open top and comprising side walls and end walls, each of said walls comprising a substantially planar upper edge region and a perimetric flange; ii) a removable cover comprising a plurality of securing members each extending from outer edges of the cover, the securing members being adapted to lockably engage the first and second side walls and the first and second end walls to the perimetric flange; and iii) a lock release tool configured to be receivable over the removable cover comprising: (a) a plurality of latch members each adapted to engage a respective one of the securing members; (b) a cam assembly and a plurality of cam followers, each cam follower being operatively connected to a respective one of the latch members; and (c) a rotatable handle operatively connected to the cam assembly to move the cam followers selectively between a minimum engaged position in which the latch members are secured to the removable cover, and a maximum engaged position in which pressure exerted by the cam followers moves the latch members to pull the securing members away from the first and second side walls and the first and second end walls to release the removable cover.

According to yet another aspect of the present invention, there is provided a lockable enclosure system for a wireless device, the system comprising: (i) an enclosure comprising: (a) a bottom portion with an open top and comprising a base, a pair of opposing first and second side walls and a pair of opposing first and second end walls, each said wall comprising a substantially planar upper edge region and a perimetric flange, the first and second side walls and the first end wall each further comprising engagement members extending normally from the flange, the second end wall comprising a protrusion defining a recess region, the bottom portion being adapted to receive and releasably secure the wireless device in a snug fit and to cushion the wireless device from shock; (b) a flexible, tear-resistant transparent film capable of accepting and transmitting pressure inputs to the wireless device, the film being configured to extend over and cover the common plane and be supported by the said walls and to completely cover the wireless device; (c) a removable cover having a lower surface adapted to press the film against the said walls to produce a water-resistant seal about the wireless device and comprising: (1) a planar outer surface including a central display aperture; (2) three securing members each extending from a respective one of three outer edges of the cover, the securing members being adapted to lockably engage the first and second side walls and the first end wall of the enclosure; (3) recess regions between the three securing members adapted to receive and engage the engagement members; and (4) a projecting member extending from the fourth outer edge of the cover, adapted to be received in the recess region of the enclosure; and (ii) a lock release tool comprising: (a) a base plate configured to be receivable over the cover; (b) three latch members each adapted to engage a respective one of the three securing members; (c) a cam assembly and a plurality of cam followers each cam follower being operatively connected to a respective one of the three latch members; and (d) a rotatable handle operatively connected to the cam assembly to move the cam followers selectively between a minimum engaged position in which the latch members are secured to the removable cover of the enclosure, and a maximum engaged position in which pressure exerted by the cam followers moves the latch members to pull the three securing members away from the enclosure walls to release the cover from the enclosure, wherein when the cam followers are in the maximum engaged position, the cam assembly is in a locked position thereby preventing the securing members from returning to the enclosure walls.

BRIEF DESCRIPTION OF THE DRAWINGS

The embodiments of the enclosure system will now be described by reference to the following figures, in which identical reference numerals in different figures indicate identical elements and in which:

FIG. 11A is an exploded perspective view of the lock release tool shown in FIGS. 8A and 8B.

FIG. 11B illustrates a rotational element for use in the lock release tool shown in FIG. 11A.

DETAILED DESCRIPTION OF PREFERRED EMBODIMENTS

Referring now to FIGS. 1 to 4, an embodiment of an enclosure is shown, designed to be used as an enclosure system, in conjunction with the lock release tool, discussed in relation to FIGS. 8 to 11 below.

Figure 1:
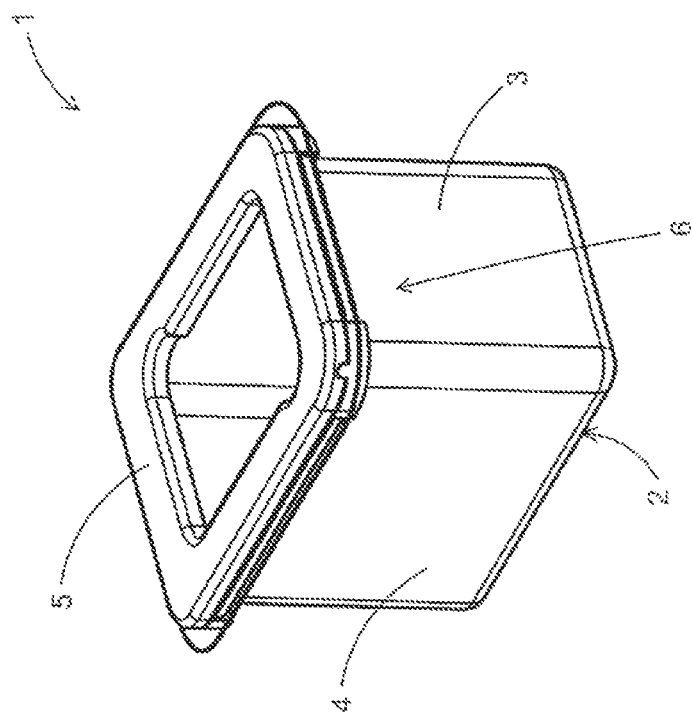
FIG. 1 is a perspective view of an embodiment of an enclosure for use in an enclosure system.
Figure 2:
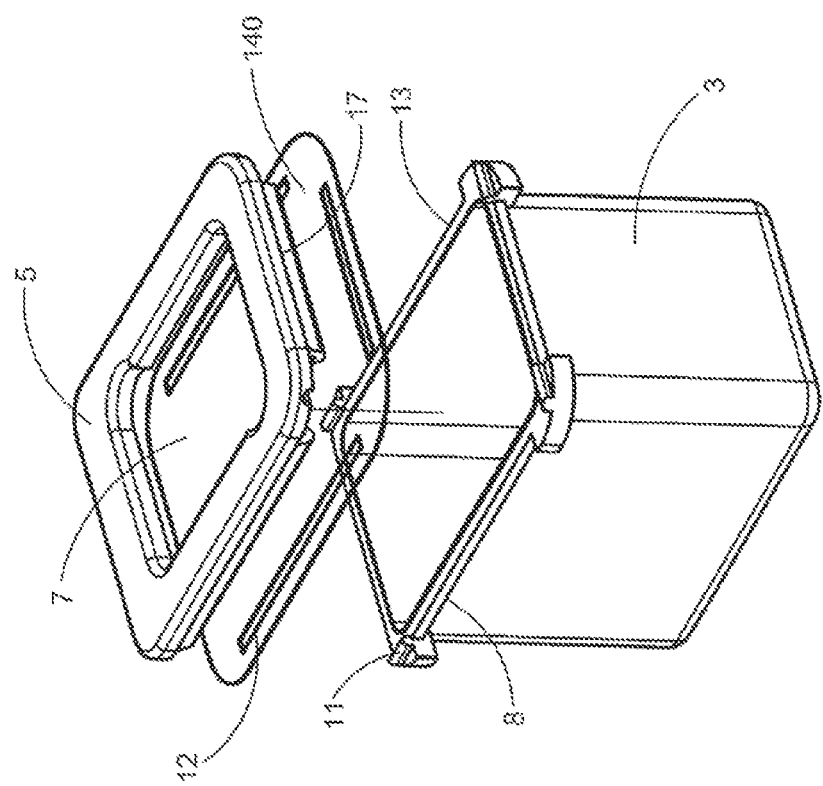
FIG. 2 is an exploded perspective view of the enclosure shown in FIG. 1.
Figure 3:
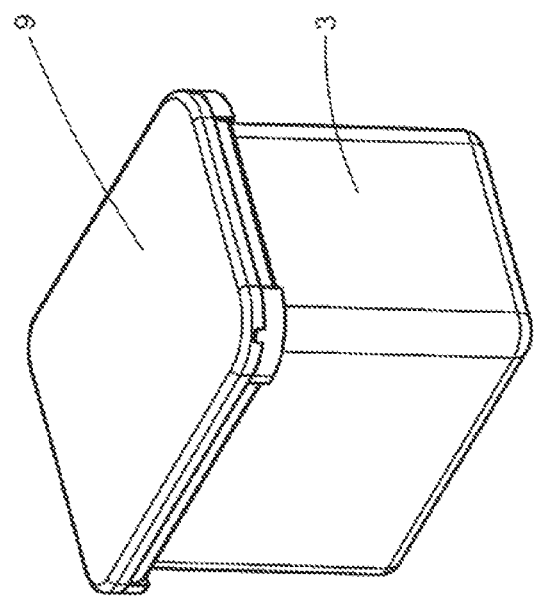
FIG. 3 is a perspective view of a second embodiment of an enclosure for use in an enclosure system, illustrating a closed top.
Figure 4:
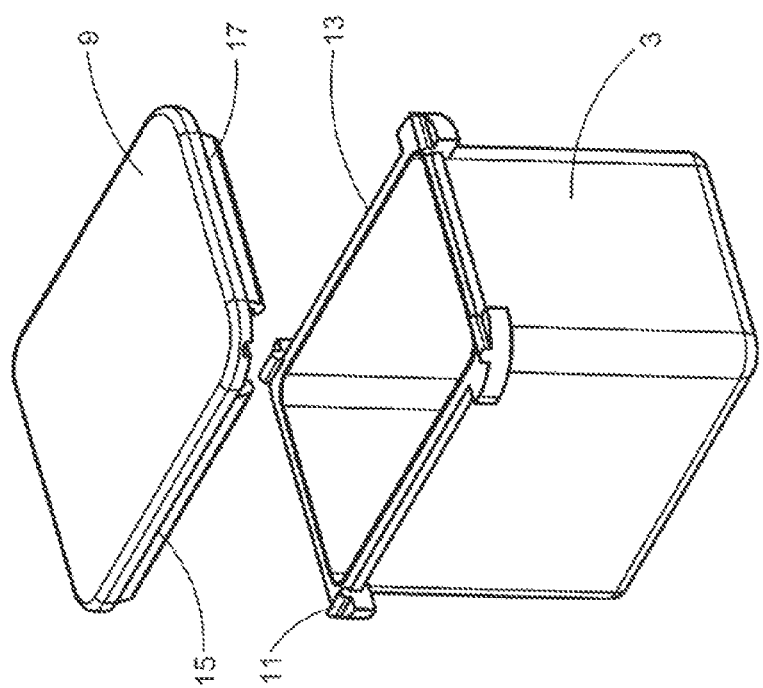
FIG. 4 is an exploded perspective view of the enclosure shown in FIG. 3.

Referring to FIGS. 1 and 2, there is shown an embodiment of a enclosure, shown generally at 1, comprising an open-topped bottom container 3 and a removable plastic film 140 and a cover 5 having a central opening 7 defined therein. FIGS. 3 and 4 illustrate a further embodiment of a variation of the cover 9 having a solid upper surface, rather than embodiment of the cover 5 shown in FIGS. 1 and 2 having the central opening 7 defined therein.

The bottom container 3 and cover 5, 9 in an exemplary embodiment, can be injection molded out of a suitable thermoplastic such as an acetal copolymer plastic such as is manufactured under the Trade-mark DELRIN, though it will be understood that numerous other materials could be utilized. With reference to FIG. 1, the bottom container 3 has a thickened bottom 2 and side 4 and end walls 6. Preferably, the thickness of all three structures is the same. The bottom container 3 will also have a perimetric flange 13, and engagement members 11 at each of the four corners of container 3.

As shown in FIGS. 1 and 2, above container 3, waterproof membrane 140 is provided, which can be configured as shown so as to be secured over the container 3 at an upper edge thereof, and thereafter trimmed to size, if necessary. The waterproof membrane 140 is a thin gauge transparent plastic sheet having dimensions at least equal that of the length and width of the lip 8 of the bottom container 3 shown in FIG. 2, where the side walls 4 and end walls 6 terminate at the open end of the container 3. Preferably, the plastic film 140 is die cut to conform and correspond to the outer perimeter of the lip 8 of the container 3, with apertures 12 therein corresponding to the position of securing members 10 on the cover 3 (shown in FIG. 4), through which the securing members 17 of the cover 3 are inserted. Suitable plastic film material may be static cling clear vinyl manufactured by Gerber Scientific Products Inc. as model No. AP50823 and having a thickness of 0.007". However, so long as the plastic film 140 is sufficiently flexible, any plastic film material would be satisfactory.

The cover 5 (or 9 as shown in the embodiment shown in FIGS. 3 and 4), as best seen in FIG. 4, comprises an outer perimeter 15 and securing members 17 extending downwardly, so that on closing container 3, they securely engage perimetric flange 13, to seal the container 3 in a closed position, in which membrane 140 is securely retained in the proper position, to provide water-resistance to the container 3. Between adjacent securing members 17, recesses (not shown) are configured to receive engagement members 11, as shown in FIG. 4, when the cover 5, 9 is secured to the container 3.

Figure 5:
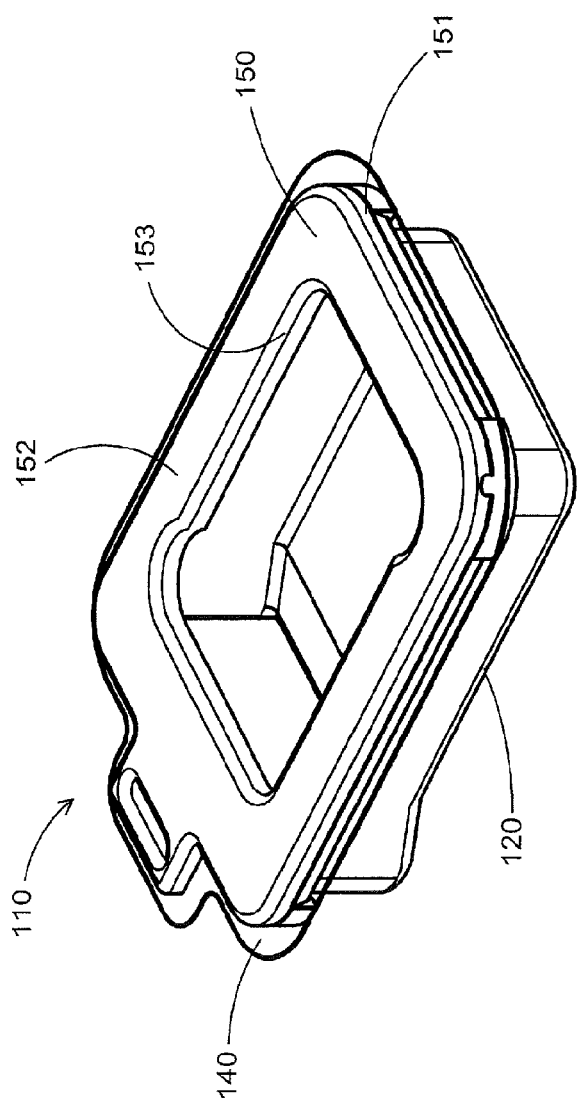
FIG. 5 is a perspective view of a third embodiment of an enclosure for use in an enclosure system.
Figure 6:
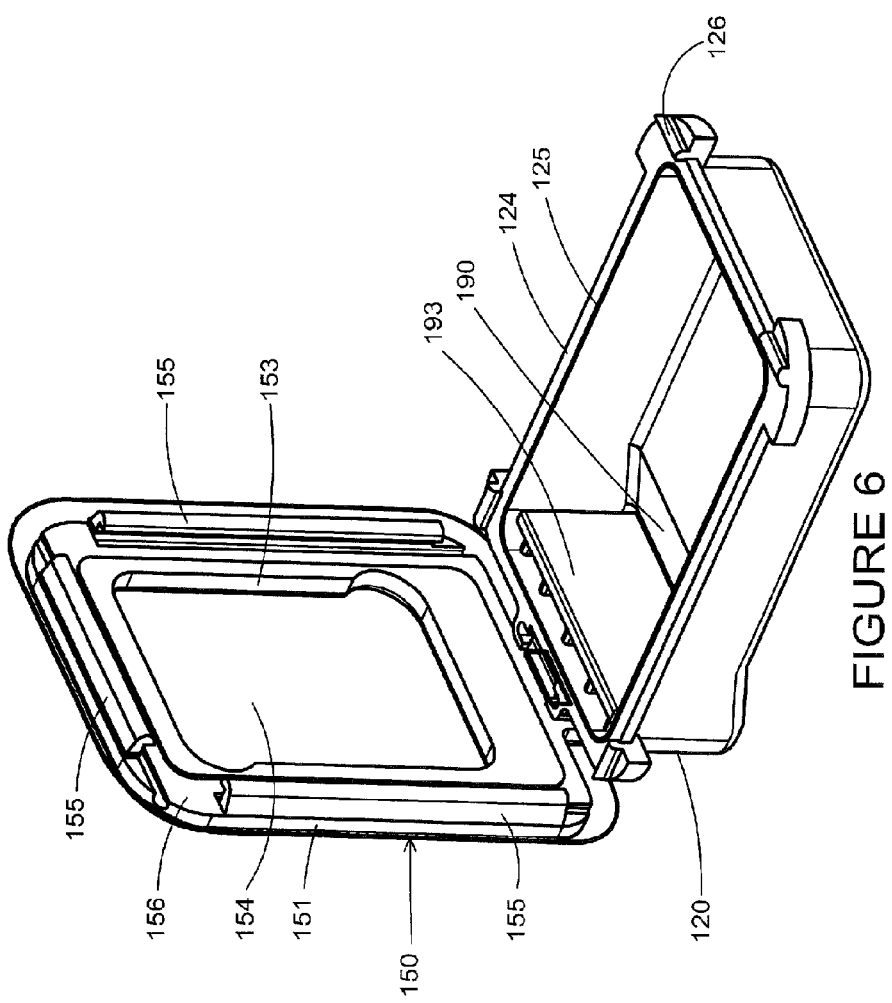
FIG. 6 is a perspective view of the enclosure shown in FIG. 5 in an opened position.
Figure 7:
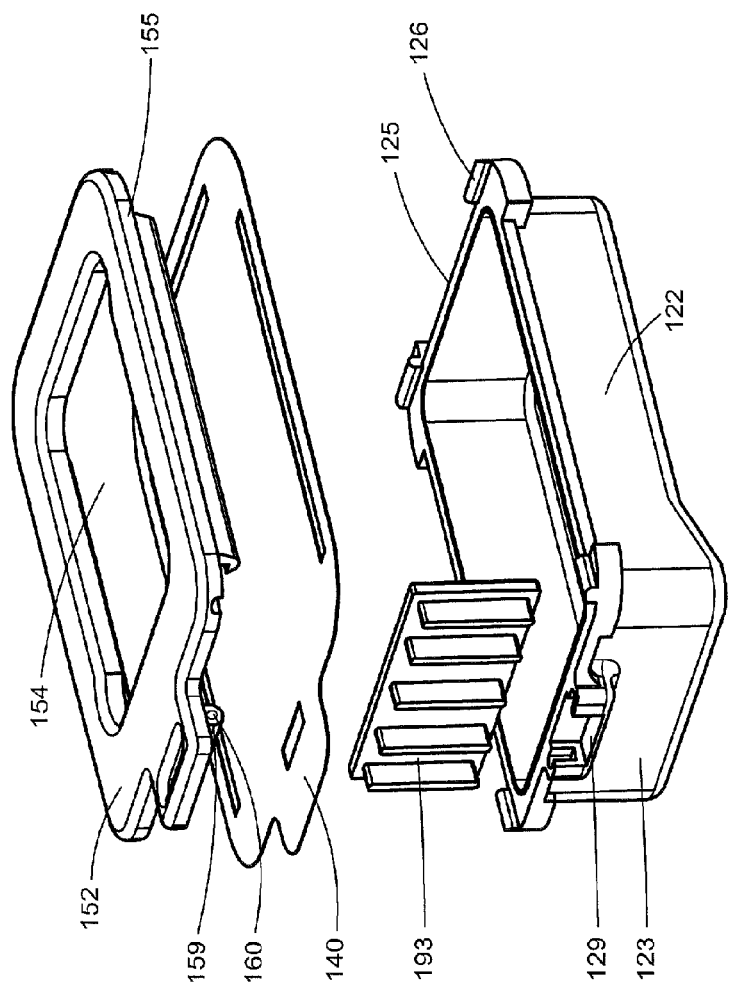
FIG. 7 is an exploded perspective view of the enclosure shown in FIG. 5.

Referring now to FIGS. 5 to 7, a further embodiment of an enclosure is shown, designed to be used as an enclosure system, in conjunction with a lock release tool, discussed in relation to FIGS. 8 to 11 below.

FIGS. 5 and 6 are perspective views of the enclosure of this embodiment, in closed and open positions respectively; and FIG. 7 is an exploded perspective view of the enclosure. Enclosure 110 comprises a substantially rectilinear container 120, having side walls 122 and end walls 123, upper edge region 124, a perimetric flange 125, and engagement members 126 at each of the four corners of container 120. Recess 190 provides for optional divider 193 for securing identification or tracking elements (not shown). Above container 120, waterproof membrane 140 is provided, which can be configured as shown so as to be secured over corresponding profiled areas at upper edge region 124, and thereafter trimmed to size.

Cover 150 comprises outer perimeter 151, top surface 152, and inner perimeter 153 defining aperture 154. As best seen in FIGS. 6 and 7, on three sides of cover 150, securing members 155 extend downwardly, so that on closing enclosure 120, they securely engage perimetric flange 125, to hold enclosure 110 in a closed position, in which membrane 140 is securely retained in the proper position, to provide water-resistance to enclosure 110. Between adjacent securing members 155, recesses 156 are configured to receive engagement members 126. On the fourth side of cover 150, protrusion 159 having longitudinal bore 160 is provided, which is configured to be received within recess 129 in container 120 (see FIG. 7). A pin (not shown) can be inserted through bore 160 to secure protrusion 159 within recess 129.

Referring now to FIGS. 8 to 12, a lock release tool in an embodiment of the enclosure system is shown.

Figure 8A:
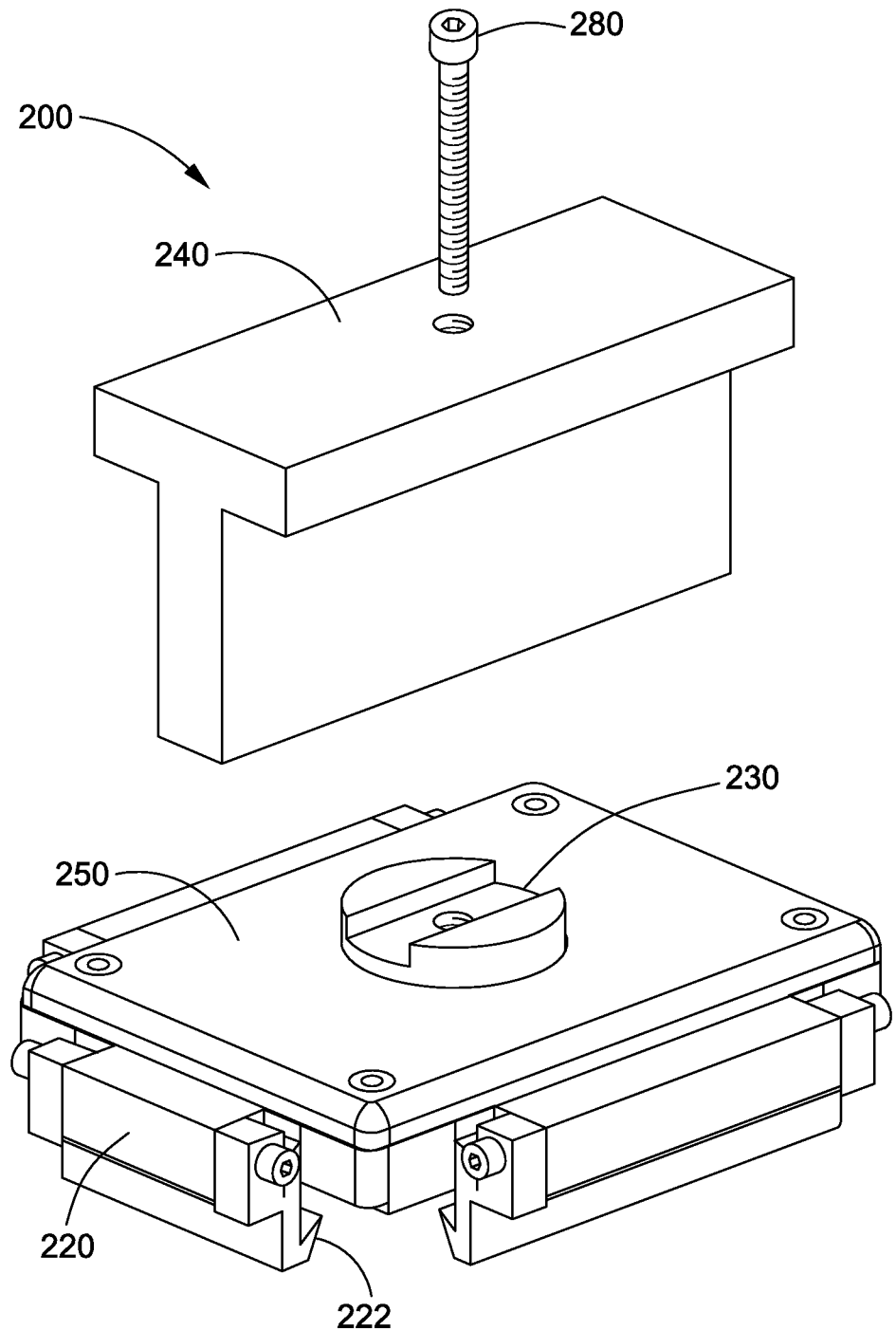
FIGS. 8A and 8B each illustrate a top perspective view of an embodiment of a lock release tool for use in an enclosure system.
Figure 8B:
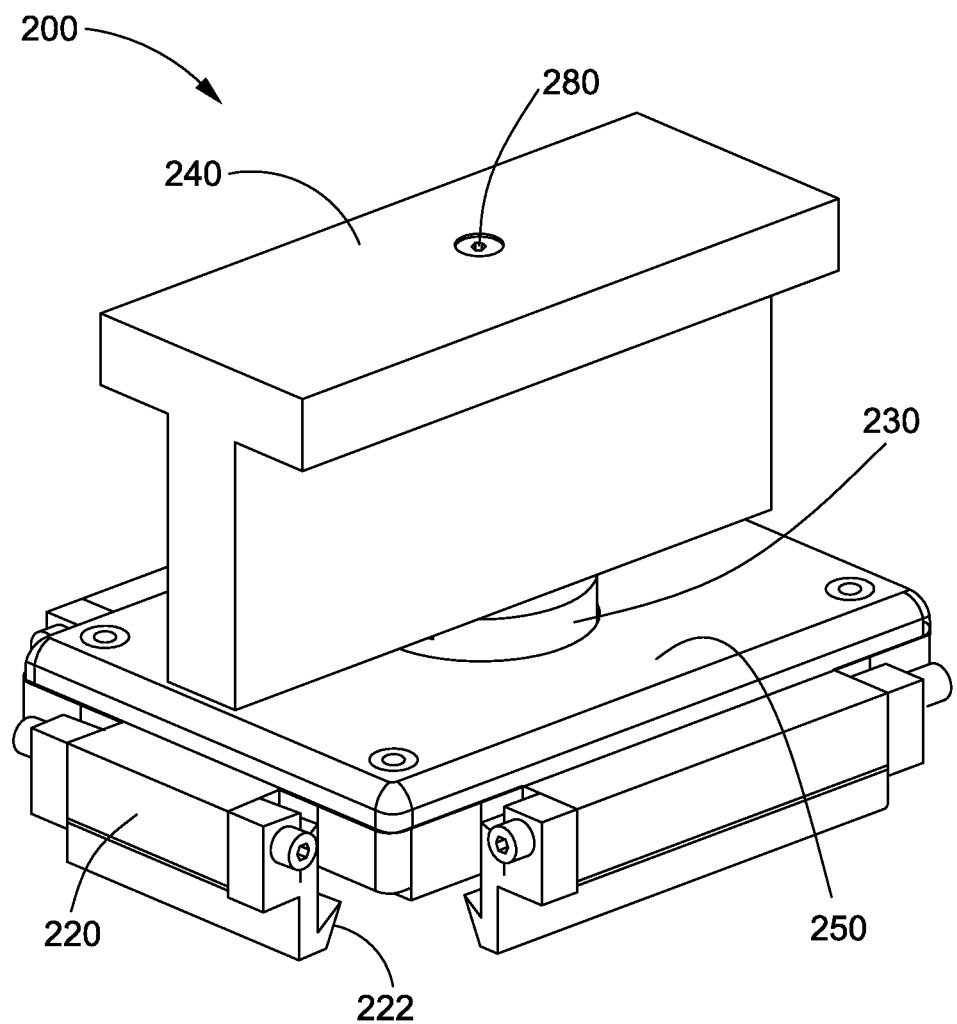
Figure 9:
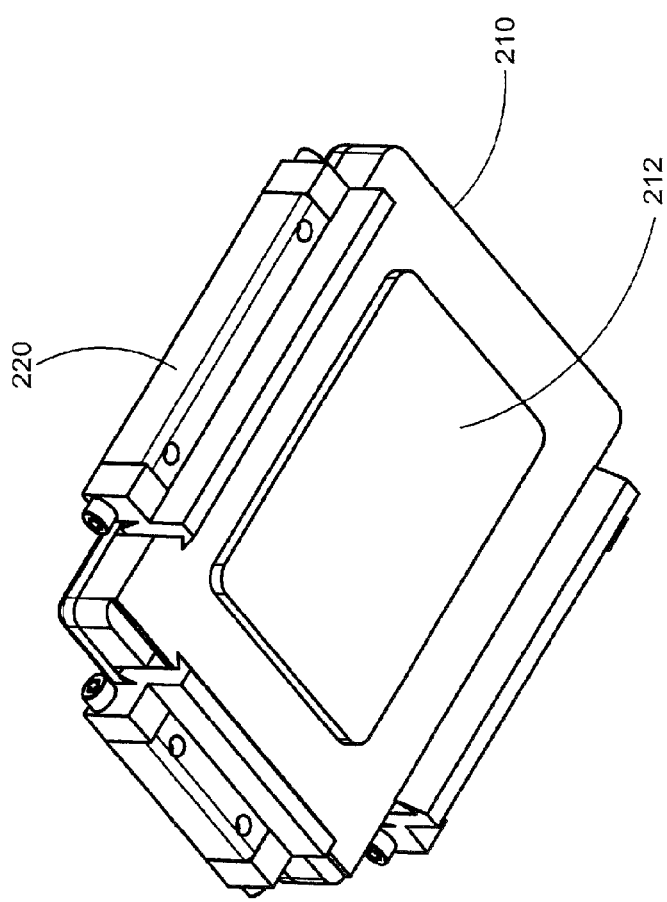
FIG. 9 is a bottom perspective view of the lock release tool shown in FIGS. 8A and 8B.
Figure 10A:
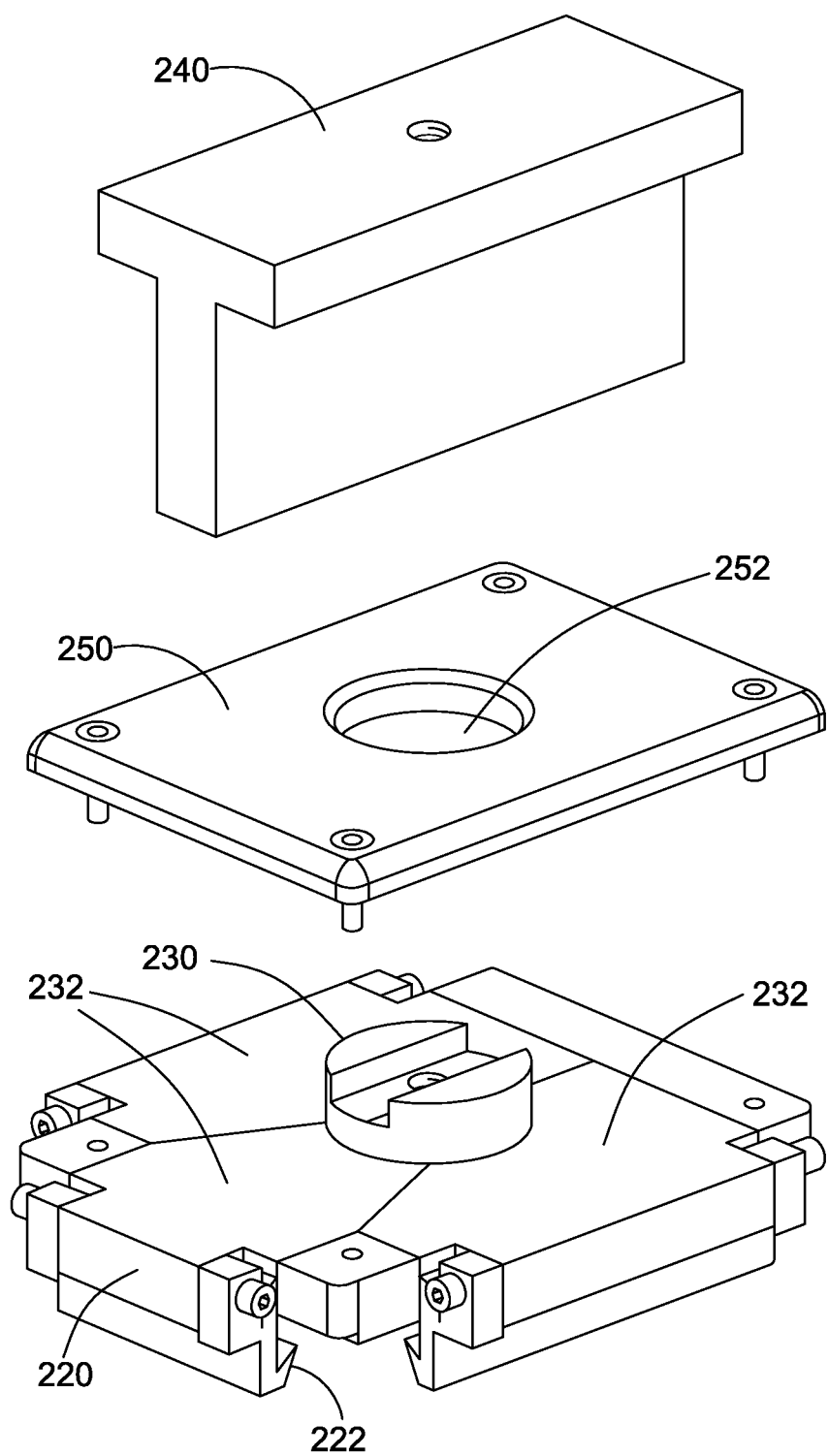
FIG. 10A is a partly exploded perspective view of the lock release tool shown in FIGS. 8A and 8B.

FIGS. 8A, 8B and 9 are top and bottom perspective views of lock release tool 200, which is configured to be used with the enclosure 1 shown in FIGS. 1 to 4, or with the enclosure 110 shown in FIGS. 5 to 7. FIGS. 10A and 11A are exploded perspective views of lock release tool 200.

As shown in FIGS. 8A and 8B, lock release tool 200 comprises handle 240 that is operatively connected to cam assembly 230. FIG. 8A illustrates the handle 240 removed from the cam assembly 230, while FIG. 8B illustrates the handle 240 attached to cam assembly 230.

With reference to FIGS. 8A and 8B, the handle 240 can be secured to the cam assembly 230 by means of a screw 280, and such screws can also be utilized to secure cover 250 to base plate 210. It will be understood that other variations as to the method of securement used can be effected, as would be apparent to a worker skilled in the art.

As shown in FIG. 9, lock release tool 200 comprises base plate 210, having protruding portion 212. As shown in FIG. 10A, lock release tool 200 further comprises cam assembly 230 and cam followers 232, which are operatively connected to corresponding latch members 220, though it will be understood that variations as to the number of latch members and cam followers utilized could be effected.

Base plate 210 is configured to be compatible with the dimensions and configuration of cover 5 or 9 of the enclosure embodiments shown in FIGS. 1-4, or with the dimensions and configuration of enclosure 110 (see FIG. 5).

Figure 10B:
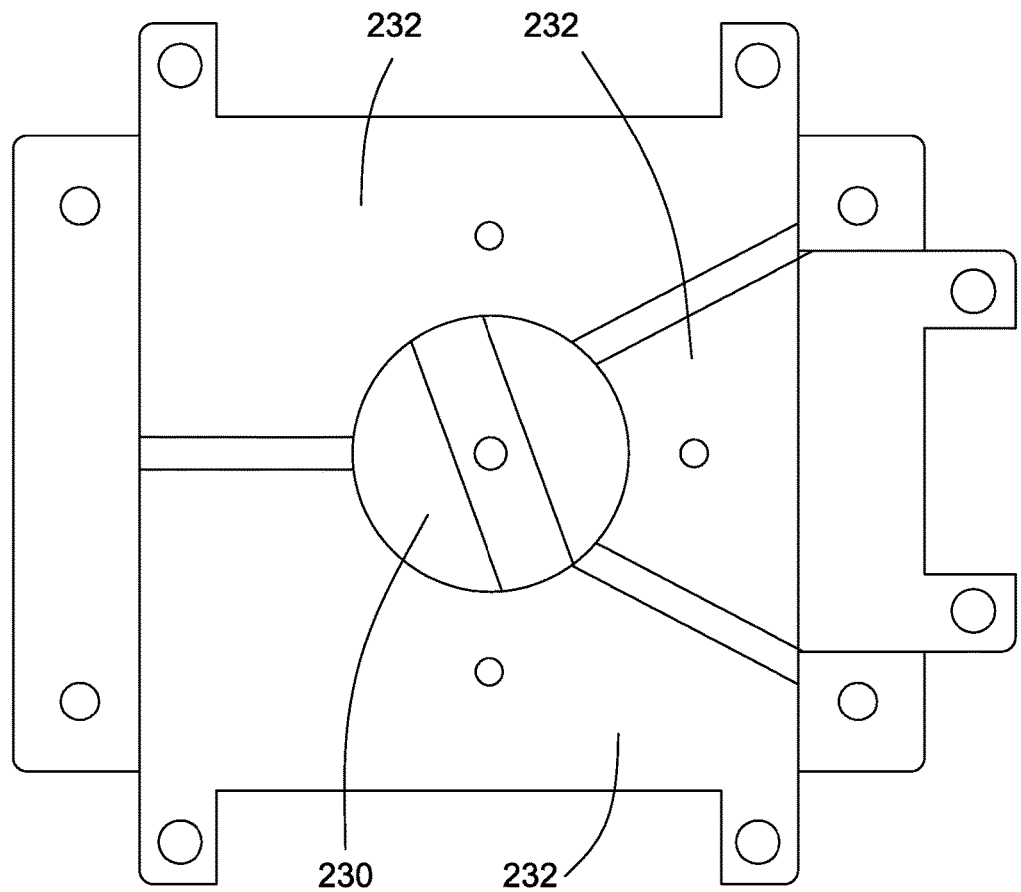
FIG. 10B is a plan view of the release tool shown in FIG. 8, with the handle removed.

Cam assembly 230 is operatively connected to handle 240. Cam followers 232 are in central contact with cam assembly 230, and are also operatively connected to the base plate 210 by suitable means, such as pin elements 236, as shown in FIGS. 10B and 11. In FIG. 10B, handle 240 has been removed for the sake of clarity to illustrate that when the cam assembly 230 is rotated (via the handle 240), cam followers 232 separate and expand beyond the perimeter of the base plate (not shown).

Figure 12:
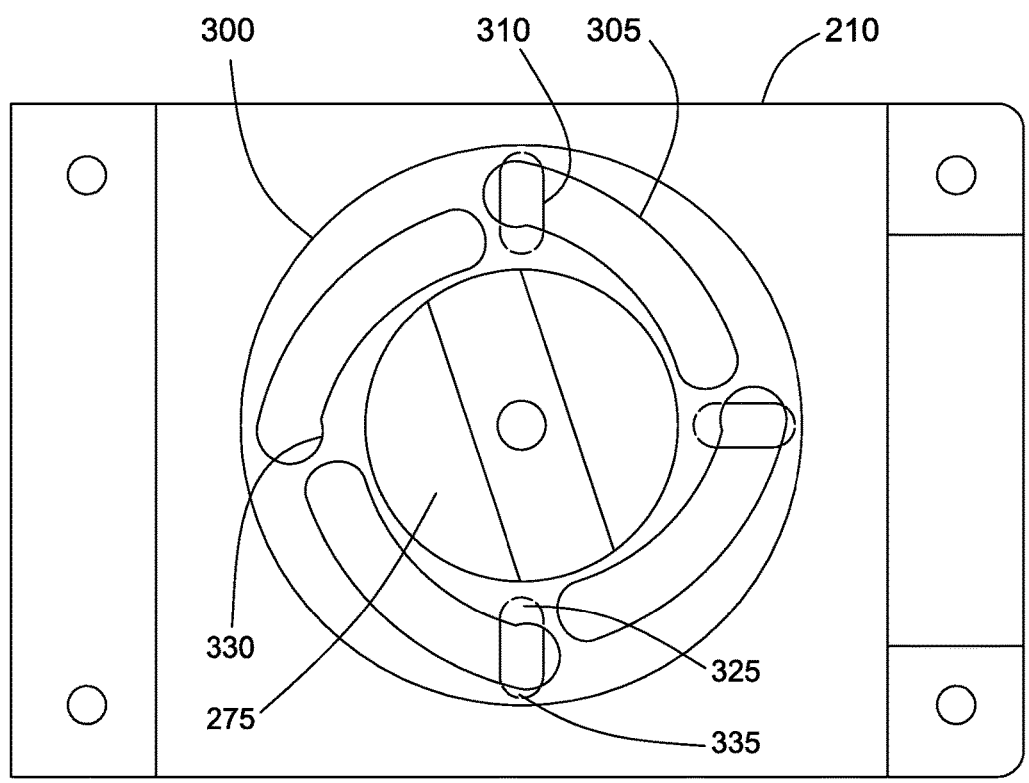
FIG. 12 illustrates rotational features lock release tool shown in FIG. 11A.

FIG. 12 illustrates the rotational mechanism of the cam assembly 230 in greater detail, in which the cam followers have been removed for greater clarity. Cam assembly 230 includes a central handle base 275 that is attached to wheel 300, which includes a series of grooves 305 arranged in a pinwheel configuration around the central handle base 275. Each groove 305 has a seat 330 at one extremity thereof. Beneath the wheel 300, on the base plate 210, are a plurality of tracks 310, which mirror the plurality of tracks 315 etched into the lower surface of cover 250 (see FIG. 11A). Each track 310 (and 315) is oriented radially towards the centre of the wheel 300, i.e. each track 310 is perpendicular to the tangentially circumferential grooves 305.

The combination of a pin element 236, inserted into a rotatable bushing 237 (see FIG. 11A), is inserted into each groove 305. The bushing 237 can be made of a material that endures wear and tear, but also allows the bushing 237 to rotate about the pin element 236, as the bushing 237 moves through the groove 305 when the wheel 300 is rotated. As an example, the bushing can be made out of brass.

As the wheel 300 rotates, the pin element 236 moves along the respective track 310, between a position proximal 325 to the central handle base 275, and a position distal 335 to the central handle base 275, thereby causing the cam follower 232 to move along a similar path to that of the pin element 236.

When the pin element 236 is at the distal end 335 of the track 310, the bushing 237 reaches the end of the groove 305 ands "sits" in seat 330. This prevents the cam assembly from rotating backwards when the tool 200 pushes out the securing elements (17, 155) from the enclosure, as the securing elements (17, 155) have resiliency. When the bushing 237 sits in seat 330, the handle 240 "locks" in a position such that the cam followers 232 are separated.

Each seat 330 is located at the extremity of each groove 305 that corresponds to the cam assembly position in which the cam followers 232 separate.

Cover 250 is secured over base plate 210 and the cam mechanism, such that handle 240 is accessible from above cover 250 through aperture 252, and without interference with the operational movement of latch members 220.

It will be understood that the enclosure system can utilize different configurations of covers from that described above, such as a cover hinged on one end or side of the container 3, provided that if, for example, a hinged variation of the cover is used, the number of cam followers 232 will match that of the number of latch members 220.

With reference to operation of the lock release tool with enclosure embodiments shown in FIGS. 1-4, lock release tool 200 is placed over cover 5 of container 3 (as shown in FIGS. 1 and 2) or solid cover 9 of container 3 (as shown in FIGS. 3 and 4), and base plate 210 located by means of protruding portion 212, which is configured to be compatible with aperture 7 in the embodiment of the cover 5 of container 3 shown in FIGS. 1 and 2. Each of latch members 220 is aligned with one of securing members 17. Latches 222 engage with the lower edges of securing members 17; latches 222 can be of any suitable configuration, such as V-shaped as shown, or a chamfered or otherwise rounded shape, configured to be compatible with a desired configuration of lower edges of securing members 17. Handle 240 can then be turned so that cam assembly 230 acts on cam followers 232, which moves latch members 220 outwards away from base plate 210. This movement applies a pulling force simultaneously to each of securing members 17 by means of latches 222, such that each of securing members 17 is released from perimetric flange 13 (as shown in FIG. 2), and cover 5,9 can thereby be lifted from container 3 to open it and allow access to its contents. To close and lock the cover 5,9 again to the container 3, the handle 240 can be turned in opposite direction, to re-engage the securing members 17 to the perimetric flange 13.

In a further embodiment, the cover 5, 9 and container 3 can have every other side of an opposed configuration with respect to the combination of latches 222 and securing members 17 utilized. In such a configuration the cover 5,9 would have, for example, side A & C as latches 222 and sides B & D having securing members 17. The container 3 would then have, in such a configuration, sides A & C having securing members 17 and sides B & D having latches 222. Of course, it will be understood that the combinations, and locations, of these utilized could be varied, as desired.

With reference to operation of the lock release tool with enclosure embodiments shown in FIGS. 5-7, lock release tool 200 is placed over cover 150 of enclosure 110, and base plate 210 located by means of protruding portion 212, which is configured to be compatible with aperture 154 in cover 150 of enclosure 110, so that each of latch members 220 is aligned with one of securing members 155. Latches 222 engage with the lower edges of securing members 155; latches 222 can be of any suitable configuration, such as V-shaped as shown, or a chamfered or otherwise rounded shape, configured to be compatible with a desired configuration of lower edges of securing members 155. Handle 240 can then be turned so that cam assembly 230 acts on cam followers 232, which moves latch members 220 outwards away from base plate 210. This movement applies a pulling force simultaneously to each of securing members 155 by means of latches 222, such that each of securing members 155 is released from perimetric flange 125, and cover 150 can thereby be lifted from container 120 to open enclosure 110 and allow access to its contents.

CONCLUSION

The simple design of the enclosure system, including the use of relatively universally available or readily manufactured parts renders the manufacture of the enclosure system straightforward and thus inexpensive. In addition, the enclosure system can be used for various storage purposes, such as food storage, storage of items such as jewelry and electronic items. The enclosure system can also be made of material that can be fire resistant as well, or water-proofed material.

The relatively few parts and innovative hinging mechanism, and in particular the features of the enclosure system, permit the development of a water-resistant and shock-resistant enclosure for a pager or similar device that can be quickly and easily opened and re-closed in the event of any necessary maintenance operation on the pager, obviating any complicated positioning procedures during assembly or re-assembly.

Despite these operational efficiencies, the enclosure system provides substantial water- and shock-resistance, which greatly extends the life of the pagers in the harsh and unforgiving environment of the facility.

It will be apparent to those skilled in this art that various modifications and variations may be made to the embodiments disclosed herein without departing from the spirit and scope of the enclosure system.

Other embodiments consistent with the enclosure system will become apparent from consideration of the specification and the practice of the enclosure system disclosed therein. Accordingly, the specification and the embodiments are to be considered exemplary only, with a true scope and spirit of the enclosure system being disclosed by the following claims.

The embodiments of the invention in which an exclusive property or privilege is claimed are defined as follows:

1. A lockable enclosure system comprising:
   i) a bottom portion with an open top and comprising a pair of opposed first and second side walls and a pair of opposed first and second end walls, each of said walls comprising a substantially planar upper edge region and a perimetric flange, the first and second side walls and the first end wall each further comprising engagement members extending normally from the perimetric flange;
   ii) a removable cover comprising:
      (1) a plurality of securing members each extending from outer edges of the cover, the securing members being adapted to lockably engage the first and second side walls and the first and second end walls;
      (2) recess regions between the securing members adapted to receive and engage the engagement members; and
   iii) a lock release tool comprising
      (a) a base plate configured to be receivable over the removable cover;
      (b) a plurality of latch members each adapted to engage a respective one of the securing members;
      (c) a cam assembly and a plurality of cam followers each cam follower being operatively connected to a respective one of the latch members; and
      (d) a rotatable handle operatively connected to the cam assembly to move the cam followers selectively between a minimum engaged position in which the latch members are secured to the removable cover, and a maximum engaged position in which pressure exerted by the cam followers moves the latch members to pull the securing members away from the first and second side walls and the first and second end walls to release the removable cover,
   wherein:
      a) the cam assembly includes a central handle base attached to a wheel, the wheel comprising at least three grooves arranged in a pinwheel pattern around the central handle base, each groove having a seat at an extremity thereof;
      b) the base plate includes three tracks, each track positioned within each one of the grooves;
      c) within each groove is a rotation element consisting of a pin element inserted into a bushing, such that the pin element is positioned along the track;
      d) each cam follower is operatively connected to a respective pin element;

such that when the wheel rotates, the pin element moves from a position proximal the central handle base to a position distal to the central handle base, and when the pin element is at a position distal to the central handle base, the bushing sits in the seat of the groove thereby locking the cam assembly.

2. The lockable enclosure system according to claim 1, wherein the removable cover further comprises a planar outer surface including a central aperture.

3. The lockable enclosure system according to claim 1, wherein the removable cover comprises a solid planar outer surface.

4. The lockable enclosure system according to claim 1, wherein when the cam followers are in the maximum engaged position, the cam assembly is in a locked position thereby preventing the securing members from returning to the enclosure walls.

5. A lockable enclosure system comprising:
  i) a bottom portion with an open top and comprising first and second side walls and first and second end walls, each of said walls comprising a substantially planar upper edge region and a perimetric flange;
  ii) a removable cover comprising a plurality of securing members each extending from outer edges of the cover, the securing members being adapted to lockably engage the first and second side walls and the first and second end walls; and
  iii) a lock release tool configured to be receivable over the removable cover comprising
    (a) a plurality of latch members each adapted to engage a respective one of the securing members;
    (b) a cam assembly and a plurality of cam followers, each cam follower being operatively connected to a respective one of the latch members; and
    (c) a rotatable handle operatively connected to the cam assembly to move the cam followers selectively between a minimum engaged position in which the latch members are secured to the removable cover, and a maximum engaged position in which pressure exerted by the cam followers moves the latch members to pull the securing members away from the first and second side walls and the first and second end walls to release the removable cover,
wherein:
  a) the cam assembly includes a central handle base attached to a wheel, the wheel comprising at least three grooves arranged in a pinwheel pattern around the central handle base, each groove having a seat at an extremity thereof;
  b) the base plate includes three tracks, each track positioned within each one of the grooves;
  c) within each groove is a rotation element consisting of a pin element inserted into a bushing, such that the pin element is positioned along the track;
  d) each cam follower is operatively connected to a respective pin element;
    such that when the wheel rotates, the pin element moves from a position proximal the central handle base to a position distal to the central handle base, and when the pin element is at a position distal to the central handle base, the bushing sits in the seat of the groove thereby locking the cam assembly.

6. The lockable enclosure system according to claim 5, wherein the lock release tool further comprises a base plate, the base plate being configured to be receivable over the removable cover.

7. The lockable enclosure system according to claim 5, wherein the first and second side walls are opposite one another, and the first and second end walls are opposite one another.

8. The lockable enclosure system according to claim 5, wherein the side walls and the end walls each further comprise engagement members extending normally from the perimetric flange.

9. The lockable enclosure system according to claim 8, wherein the removable cover further comprises recess regions between the securing members adapted to receive and engage the engagement members of the perimetric flange.

10. The lockable enclosure system according to claim 5, wherein when the cam followers are in the maximum engaged position, the cam assembly is in a locked position thereby preventing the securing members from returning to the enclosure walls.

11. A lockable enclosure system for a wireless device, the system comprising:
  (i) an enclosure comprising:
    (a) a bottom portion with an open top and comprising a base, a pair of opposing first and second side walls and a pair of opposing first and second end walls, each said wall comprising a substantially planar upper edge region and a perimetric flange, the first and second side walls and the first end wall each further comprising engagement members extending normally from the flange, the second end wall comprising a protrusion defining a recess region, the bottom portion being adapted to receive and releasably secure the wireless device in a snug fit and to cushion the wireless device from shock;
    (b) a flexible, tear-resistant transparent film capable of accepting and transmitting pressure inputs to the wireless device, the film being configured to extend over and cover the common plane and be supported by the said walls and to completely cover the wireless device;
    (c) a removable cover having a lower surface adapted to press the film against the said walls to produce a water-resistant seal about the wireless device and comprising:
      (1) a planar outer surface including a central display aperture;
      (2) three securing members each extending from a respective one of three outer edges of the cover, the securing members being adapted to lockably engage the first and second side walls and the first end wall of the enclosure;
      (3) recess regions between the three securing members adapted to receive and engage the engagement members; and
      (4) a projecting member extending from the fourth outer edge of the cover, adapted to be received in the recess region of the enclosure;
  and
  (ii) a lock release tool comprising:
    (a) a base plate configured to be receivable over the cover;
    (b) three latch members each adapted to engage a respective one of the three securing members;
    (c) a cam assembly and a plurality of cam followers each cam follower being operatively connected to a respective one of the three latch members; and
    (d) a rotatable handle operatively connected to the cam assembly to move the cam followers selectively between a minimum engaged position in which the latch members are secured to the removable cover of the enclosure, and a maximum engaged position in which pressure exerted by the cam followers moves the latch members to pull the three securing members away from the enclosure walls to release the cover from the enclosure, wherein when the cam followers are in the maximum engaged position, the cam assembly is in a locked position thereby preventing the securing members from returning to the enclosure walls, and wherein:
- a) the cam assembly includes a central handle base attached to a wheel, the wheel comprising at least three grooves arranged in a pinwheel pattern around the central handle base, each groove having a seat at an extremity thereof;
- b) the base plate includes three tracks, each track positioned within each one of the grooves;
- c) within each groove is a rotation element consisting of a pin element inserted into a bushing, such that the pin element is positioned along the track;
- d) each cam follower is operatively connected to a respective pin element;

such that when the wheel rotates, the pin element moves from a positional proximal the central handle base to a position distal to the central handle base, and when the pin element is at a position distal to the central handle base, the bushing sits in the seat of the groove thereby locking the cam assembly.

12. The lockable enclosure system according to claim 11, wherein the projecting member of the cover includes a bore adapted to receive a hinge pin securable within the recess region of the enclosure.

13. The lockable enclosure system according to claim 12, wherein the hinge pin is removably securable.

14. The lockable enclosure system according to claim 13, further comprising reinforcements secured within the bottom portion and substantially adjacent to each said wall.

15. The lockable enclosure system according to claim 14, wherein the reinforcements comprise compressible material or thickened sections of the bottom portion.

16. The lockable enclosure system according to claim 11, wherein the bottom portion of the enclosure further comprises a sub-enclosure adapted to receive an additional device.

17. The lockable enclosure system according to claim 16, wherein the additional device is selected from a passive location identification element and an active tracking device.

* * * * *